United States Patent [19]

Mestha

[11] Patent Number: 5,543,896
[45] Date of Patent: Aug. 6, 1996

[54] METHOD FOR MEASUREMENT OF TONE REPRODUCTION CURVE USING A SINGLE STRUCTURED PATCH

[75] Inventor: Lingappa K. Mestha, Fairport, N.Y.

[73] Assignee: Xerox Corporation, Stamford, Conn.

[21] Appl. No.: 527,616

[22] Filed: Sep. 13, 1995

[51] Int. Cl.$^6$ .................................................. G03G 21/00
[52] U.S. Cl. ........................................ 355/208; 355/246
[58] Field of Search .................................... 355/208, 245, 355/246, 203, 204; 358/400, 401

[56] References Cited

U.S. PATENT DOCUMENTS 5,471,313  11/1995  Thieret et al. ...................... 355/208 X

*Primary Examiner*—R. L. Moses
*Attorney, Agent, or Firm*—Ronald F. Chapuran

[57] ABSTRACT

A method of development control by storing a reference tone reproduction curve and providing a single test pattern including a scale of pixel values in the interdocument zone of an imaging surface. The test pattern is then sensed in the interdocument zone and a control respond to the sensing of the test patern and the reference tone reproduction curve to adjust the machine operation for print quality correction.

14 Claims, 3 Drawing Sheets

METHOD FOR MEASUREMENT OF TONE REPRODUCTION CURVE USING A SINGLE STRUCTURED PATCH

BACKGROUND OF THE INVENTION

The invention relates to xerographic process control, and more particularly, to the improvement for measurement of tone reproduction curves by using a single structured patch in the interdocument zone on a photoreceptor.

In copying or printing systems, such as a xerographic copier, laser printer, or ink-jet printer, a common technique for monitoring the quality of prints is to artificially create a "test patch" of a predetermined desired density. The actual density of the printing material (toner or ink) in the test patch can then be optically measured to determine the effectiveness of the printing process in placing this printing material on the print sheet.

In the case of xerographic devices, such as a laser printer, the surface that is typically of most interest in determining the density of printing material thereon is the charge-retentive surface or photoreceptor, on which the electrostatic latent image is formed and subsequently, developed by causing toner particles to adhere to areas thereof that are charged in a particular way. In such a case, the optical device for determining the density of toner on the test patch, which is often referred to as a "densitometer", is disposed along the path of the photoreceptor, directly downstream of the development of the development unit. There is typically a routine within the operating system of the printer to periodically create test patches of a desired density at predetermined locations on the photoreceptor by deliberately causing the exposure system thereof to charge or discharge as necessary the surface at the location to a predetermined extent.

The test patch is then moved past the developer unit and the toner particles within the developer unit are caused to adhere to the test patch electrostatically. The denser the toner on the test patch, the darker the test patch will appear in optical testing. The developed test patch is moved past a densitometer disposed along the path of the photoreceptor, and the light absorption of the test patch is tested; the more light that is absorbed by the test patch, the denser the toner on the test patch.

In any printing system using test patches for monitoring print quality, a design problem inevitably arises of where to place these test patches, particularly on photoreceptor belts or drums. Xerographic test patches are traditionally printed in the interdocument zones on the photoreceptor. They are used to measure the deposition of toner on paper to measure and control the tone reproduction curve (TRC). Generally each patch is about an inch square that is printed as a uniform solid half tone or background area. This practice enables the sensor to read one value on the tone reproduction curve for each test patch. However, that is insufficient to complete the measurement of the entire curve at reasonable intervals, especially in a multi-color print engine. To have an adequate number of points on the curve, multiple test patches have to be created.

Thus, the traditional method of process controls involves scheduling solid area, uniform halftones or background in a test patch. Some of the high quality printers contain many test patches. During the print run, each test patch is scheduled to have single halftone that would represent a single byte value on the tone reproduction curve. This is a complicated way to increase the data bandwidth required for the process control loops. It also consumes customer toner for printing many test patches.

It is also known in the prior art, for example, U.S. Pat. No. 4,341,461 to provide two test targets, each having two test patches, selectably exposed to provide test data in the photoreceptor image area for control of the toner dispensing and bias control loops. In this system, the test patches are imaged in inter-document zones on the photoreceptor. Other techniques, such as reading directly the toner on projected images without adding more test patches, have been tried. These techniques, however, do not use existing test patch areas.

It would be desirable, therefore, to be able to eliminate the need for multiple test patches to be able to measure and control a tone reproduction curve, particularly in a multi-color machine in the interdocument zone.

It is an object of the present invention therefore to provide a new an improved technique for process control, in particular, for establishing a tone reproduction curve. It is another object of the present invention to provide a single test patch within one interdocument gap in a color machine to measure a tone reproduction curve. Other advantages of the present invention will become apparent as the following description proceeds, and the features characterizing the invention will be pointed out with particularity in the claims annexed to and forming a part of this specification.

SUMMARY OF THE INVENTION

The present invention is concerned with a method of development control by storing a reference tone reproduction curve, providing a single test pattern including a scale of pixel values in the interdocument zone of the imagining surface, sensing the test pattern along the scale of pixel values in the interdocument zone and responding to the sensing of the test pattern and the reference tone reproduction curve to adjust the machine operation for print quality correction.

For a better understanding of the present invention, reference may be had to the accompanying drawings wherein the same reference numerals have been applied to like parts and wherein:

DETAILED DESCRIPTION OF THE DRAWINGS

DETAILED DESCRIPTION OF THE PREFERRED EMBODIMENT

Figure 1:
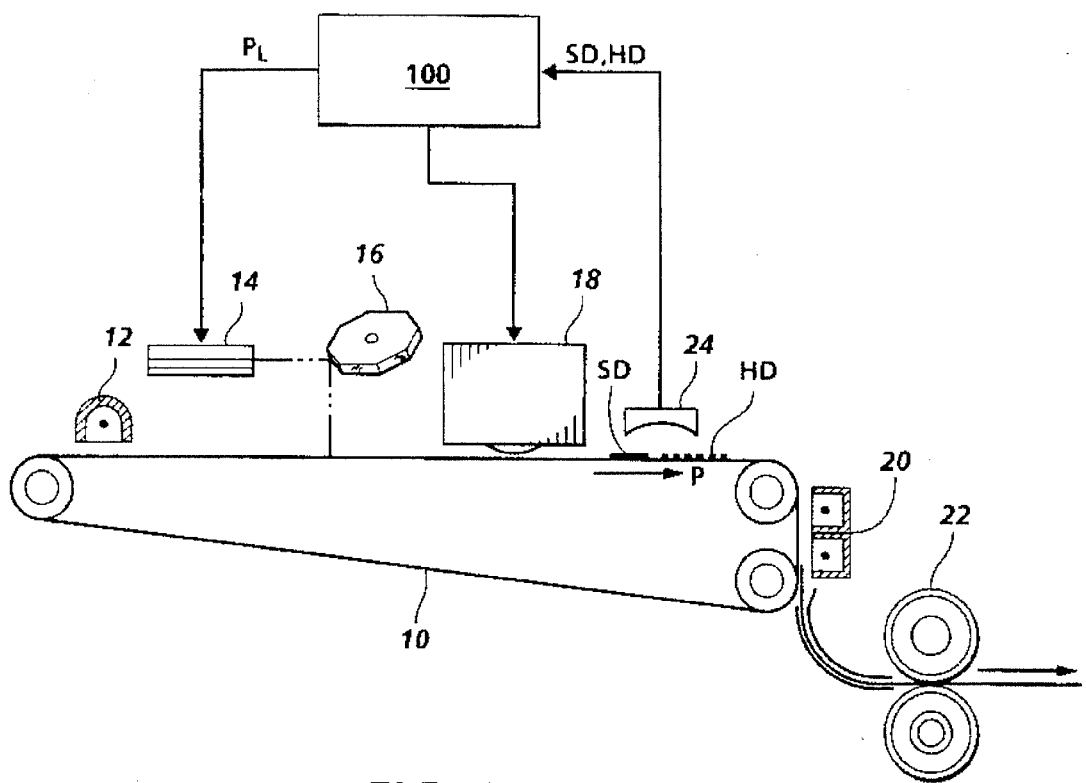
FIG. 1 is an elevational view illustrating a typical electronic imaging system incorporating tone reproduction curve control in accordance with the present invention.

FIG. 1 shows the basic elements of the well-known system by which an electrophotographic printer or laser printer uses digital image data to create a dry-toner image on plain paper. There is provided in the printer a photoreceptor 10, which may be in the form of a belt or drum, and which comprises a charge-retentive surface. The photoreceptor 10 is here entrained on a set of rollers and caused to move (by means such as a motor, not shown) through process direction P. Moving from left to right in FIG. 1, there is illustrated the basic series of steps by which an electrostatic latent image according to a desired image to be printed is created on the photoreceptor 10, subsequently developed with dry toner, and transferred to a sheet of plain paper.

The first step in the electrophotographic process is the general charging of the relevant photoreceptor surface. As seen at the far left of FIG. 1, this initial charging is performed by a charge source known as a "scorotron", indicated as 12. The scorotron 12 typically includes an ion-generating structure, such as a hot wire, to impart an electrostatic charge on the surface of the photoreceptor 10 moving past it. The charged portions of the photoreceptor 10 are then selectively discharged in a configuration corresponding to the desired image to be printed, by a raster output scanner or ROS, which generally comprises laser source 14 and a rotatable mirror 16 which act together, in a manner known in the art, to discharge certain areas of the charged photoreceptor 10. Although a laser source is shown to selectively discharge the charge-retentive surface, other apparatus that can be used for this purpose include an LED bar, or, conceivably, a light-lens system. The laser source 14 is modulated (turned on and off) in accordance with digital image data fed into it, and the rotating mirror 16 causes the modulated beam from laser source 14 to move in a fast-scan direction perpendicular to the process direction P of the photoreceptor 10. The laser source 14 outputs a laser beam of laser power PL which charges or discharges the exposed surface on photoreceptor 10, in accordance with the specific machine design.

After certain areas of the photoreceptor 10 are (in this specific instance) discharged by the laser source 14, remaining charged areas are developed by a developer unit such as 18 causing a supply of dry toner to contact the surface of photoreceptor 10. The developed image is then advanced, by the motion of photoreceptor 10, to a transfer station including a transfer scorotron such as 20, which causes the toner adhering to the photoreceptor 10 to be electrically transferred to a print sheet, which is typically a sheet of plain paper, to form the image thereon. The sheet of plain paper, with the toner image thereon is then passed through a fuser 22, which causes the toner to melt, or fuse, into the sheet of paper to create the permanent image.

The idea of "print quality" can be quantified in a number of ways, but two key measurements of print quality are (1) the solid area density, which is the darkness of a representative developed area intended to be completely covered by toner and (2) a halftone area density, which is the copy quality of a representative area which is intended to be, for example, 50% covered with toner. The halftone is typically created by virtue of a dot-screen of a particular resolution, and although the nature of such a screen will have a great effect on the absolute appearance of the halftone, as long as the same type of halftone screen is used for each test, any common halftone screen may be used. Both the solid area and halftone density may be readily measured by optical sensing systems which are familiar in the art. As shown, a densitometer generally indicated as 24 is here used after the developing step to measure the optical density of a solid density test patch (marked SD) or a halftone density test patch (HD) created on the photoreceptor 10 in a manner known in the art. Systems for measuring the true optical density of a test patch are shown in, for example, U.S. Pat. No. 4,989,985 or U.S. Pat. No. 5,204,538, both assigned to the assignee hereof and incorporated by reference herein. However, the word "densitometer" is intended to apply to any device for determining the density of print material on a surface, such as a visible-light densitometer, an infrared densitometer, an electrostatic voltmeter, or any other such device which makes a physical measurement from which the density of print material may be determined.

In accordance with the present invention, special test patterns, in particular ramp functions with pixel values uniformly varying between 255 to 0 within a confined space are allocated to a single test patch. The sensor is usually stationary in printers, whereas the photoreceptor belts or drums are allowed to move. If the pixel values of the test pattern are varied in the process direction, then the sensor will pass over the image with all combinations of background, halftone levels and solid area patches. That is, ramp function pixel values are allowed to vary along the process direction. Pixel values are held to a constant value along the slow scan direction so that the pattern looks like a wedge in two dimensional space.

Figure 2:
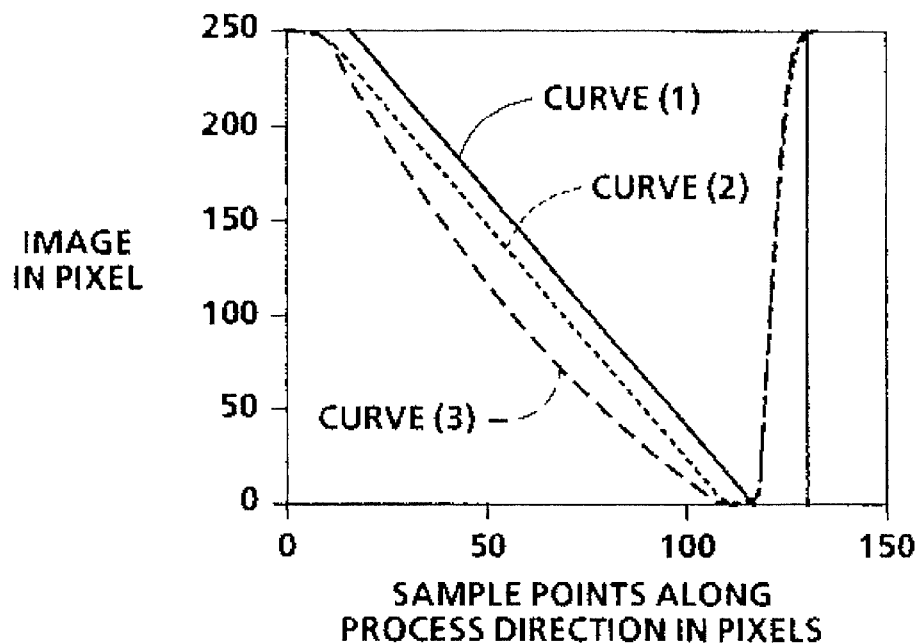
FIG. 2 illustrates a one dimensional test pattern and associated sensor measurement.

A one dimensional representation for this type of ramp function is shown in FIG. 2 solid curve (curve 1). The x-axis in this figure represents the spatial distance along the process direction in pixels. This wedge corresponds to a total of 510 pixels, which is equal to 1.32 inches of length on the photoreceptor drum.

The above test pattern was printed with a known tone reproduction curve. The sensor used was a TREK model 565 ESV. It should be noted that this technique applies equally well to any thoroughly characterized sensor. It should also be understood that the slope of the wedge pattern can be increased to cover a much smaller length such as 1 inch, 0.66 inches and 0.33 inches of the photoreceptor. The reading of the sensor is shown by dashed curve #3 in FIG. 2.

Figure 3:
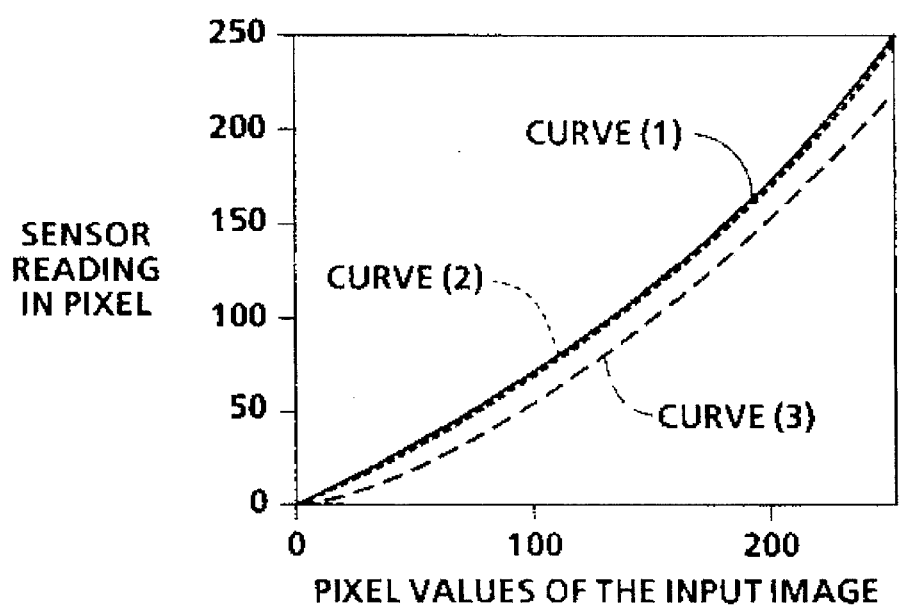
FIG. 3 illustrates measured and actual tone reproduction curves for linear TRC.

The sensor such as an ESV, ETAC or paper densitometer has an effective aperture of a few millimeters that represents the view area. This view area not only depends on the physical aperture but also is a function of how far it is located above the photoreceptor surface and a function of its response profile. The sensitivity of the sensor may also vary within its aperture. By measuring all these parameters accurately, a very good knowledge of the sensor is gained. The procedure for extracting the tone reproduction curve involves simply convoluting pixel values of the wedge pattern with the sensor model and then plotting the convoluted pixel values with the sensor reading at each sample point along the process direction. Curve #2, the dotted curve, in FIG. 2 represents the pixel values of the wedge after convoluting with the sensor model. In FIG. 3, solid curve #1 shows the actual tone reproduction curve. The dotted curve, curve #2, shows the measured curve after convoluting with the sensor model respectively for a 1.32", long wedge pattern. Dashed curve #3 in this figure is shown to represent the TRC data when the sensor model is not considered, i.e., when the input byte values of the wedge pattern are plotted against the sensor reading before convoluting with the sensor model. Clearly, an accurate measurement of the TRC requires convolution with the sensor model.

The notion described above becomes clear if one thinks of a hypothetical long test patch. If a wedge pattern were printed to sweep pixels from 255 to 0 along a 10 inch length and use a sensor with an aperture of a few millimeters like an ESV, then the TRC obtained by simply plotting the pixel values of the wedge pattern with that of the sensor reading will be very close to the actual curve. This is because the sensor view area is insignificant relative to a 10 inch long wedge pattern, since it covers only 1–2% of the sweep. As the test patch length becomes smaller, the sensor aperture becomes significant compared to the length of the test patch. By using the sensor model, compensation is made for the effects due to the aperture and the sensitivity of the sensor within the aperture.

The technique presented has been demonstrated to adequately measure the entire tone reproduction curve when the patch length is down to 0.6 inches in length. To implement this technique the convoluted wedge pattern can be stored in the printer memory. As the data from the sensor is read, this data is used along with the data on the convoluted wedge pattern to generate the entire tone reproduction curve as often as after each printed page without additional processing hardware. The number of points on the curve depends merely on how many points can be sampled from the sensor output.

Figure 4:
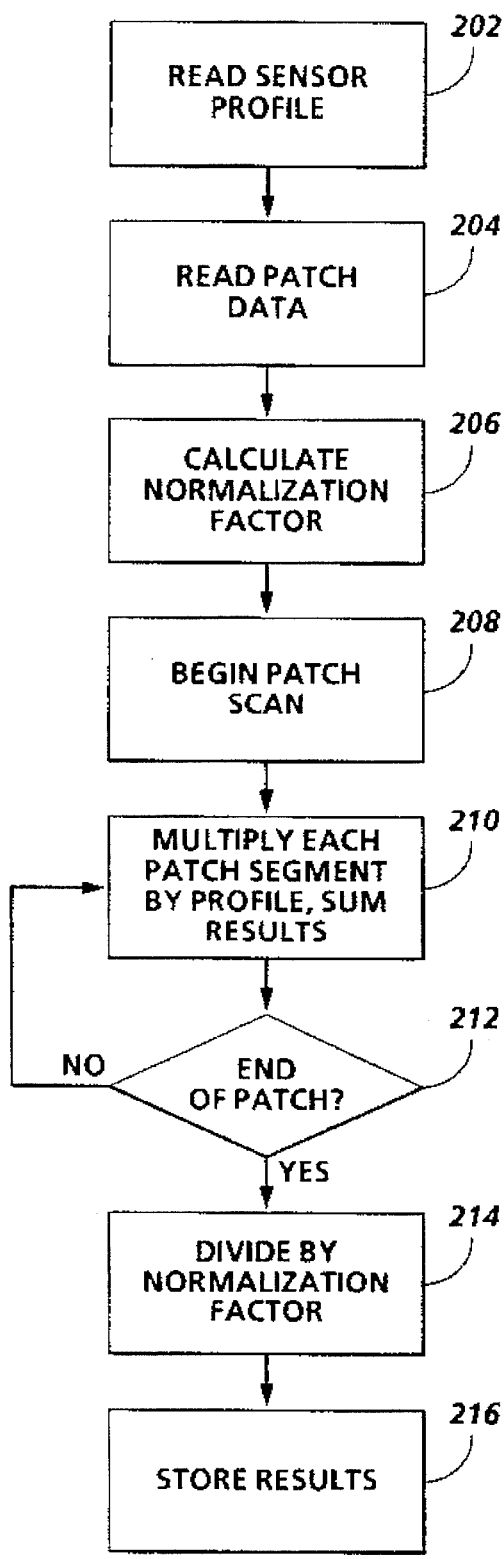
FIG. 4 is a flow chart illustrating tone reproduction curve control in accordance with the present invention.

With reference to FIG. 4, there is illustrated a flow chart of the measurement of a tone reproduction curve in accordance with the present invention. In particular, there is a background routine illustrated by blocks 202, 204, and 206, in which a sensor profile is initially read, the patch data is initially obtained, and a normalization factor calculated. In particular, in block 202, the characteristics or profile of any suitable sensor such as an infrared densitometer is read and stored to be factored with the sensed patch data. In block 204 the patch data is sensed and a normalization factor is determined in block 206. In block 208, the scan of the inter document test patch is begun and at block 210, each patch segment is multiplied by the sensor profile and the results accumulated as the interdocument patch moves across the sensor. Decision block 212 determines whether or not the end of the patch has been sensed. If not, the sensing and summing operation continues until there is a determination that the end of the patch has been reached. Once the patch has traversed the sensor, the summed results are normalized by the normalization factor determined in block 206 and the results stored as shown in block 216.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

I claim:

1. In a printing machine having a moving imaging surface, a projecting system for modulating a beam and projecting an image onto the imaging surface, a developer for application of toner to the image projected onto the imaging surface for transfer of the image to a medium, a method of development control comprising the steps of;

storing a reference tone reproduction curve, providing a single test pattern in the interdocument zone of the imaging surface, the test pattern including background, halftone, and solid area levels, sensing the test pattern along the background, halftone, and solid area levels of the test pattern in the interdocument zone of the imaging surface responding to the sensing of the test pattern and the reference tone reproduction curve to adjust the machine operation for print quality correction.

2. The method of claim 1 wherein the test pattern is approximately 1 inch square.

3. The method of claim 1 comprising pixel values uniformly varying between 0 and 250 over the length of the test pattern.

4. The method of claim 1 wherein the step of storing a reference tone reproduction curve includes the steps of:

determining a sensor profile, convoluting pixel values of the test pattern with the sensor profile, and electronically plotting the convoluted pixel values with a sensor reading at sample points along the test pattern.

5. In a printing machine having a moving imaging surface, a projecting system for modulating a beam and projecting an image onto the imaging surface, a developer for application of toner to the image projected onto the imaging surface for transfer of the image to a medium, a method of development control comprising the steps of;

providing a single test pattern in the interdocument zone of the imaging surface, the test pattern including background, halftone, and solid area levels, storing a reference tone reproduction curve including determining a sensor profile, convoluting pixel values of the test pattern with the sensor profile, and plotting the convoluted pixel values with a sensor reading at sample points along the test pattern, sensing the test pattern along the background, halftone, and solid area levels of the test pattern in the interdocument zone of the imaging surface, responding to the sensing of the test pattern and the reference tone reproduction curve to adjust the machine operation for print quality correction.

6. The method of claim 5 wherein the test pattern is in the range of 0.66–1.33 inches.

7. In a printing machine having a moving imaging surface, a projecting system for modulating a beam and projecting an image onto the imaging surface, a developer for application of toner to the image projected onto the imaging surface for transfer of the image to a medium, a method of development control comprising the steps of;

storing a reference tone reproduction curve, providing a single test pattern in the interdocument zone of the imaging surface, the test pattern including a scale of pixel values, sensing the test pattern along the scale of pixel values in the interdocument zone of the imaging surface, and responding to the sensing of the test pattern and the reference tone reproduction curve to adjust the machine operation for print quality correction.

8. The method of claim 7 wherein the step of storing a reference tone reproduction curve includes the steps of:

calculating a normalization parameter, reading a sensor profile, sensing each segment of the test pattern and multiplying each segment sensed by the sensor profile, dividing y the normalization parameter and storing the results.

9. In a printing machine having a moving imaging surface, a projecting system for modulating a beam and projecting an image onto the imaging surface, a developer for application of toner to the image projected onto the imaging surface for transfer of the image to a medium, a method of development control comprising the steps of;

storing a reference tone reproduction curve including the steps of, determining a sensor profile, and convoluting pixel values of the test pattern with the sensor profile, and electronically plotting the convoluted pixel values with a sensor reading at sample points along the test pattern, providing a single test pattern in the interdocument zone of the imaging surface, the test pattern including background, halftone, and solid area levels, sensing the test pattern along the background, halftone, and solid area levels of the test pattern in the interdocument zone of the imaging surface, responding to the sensing of the test pattern and the reference tone reproduction curve to adjust the machine operation for print quality correction.

10. The method of claim 9 wherein the test pattern is approximately 1 inch square.

11. The method of claim 9 comprising pixel values uniformly varying between 0 and 250 over the length of the test pattern.

12. In a printing machine having a moving imaging surface, a projecting system for modulating a beam and projecting an image onto the imaging surface, a developer for application of toner to the image projected onto the imaging surface for transfer of the image to a medium, a method of development control comprising the steps of;

storing a reference tone reproduction curve, providing a single test pattern in the interdocument zone of the imaging surface, the test pattern including a scale of pixel values, sensing the test pattern along the scale of pixel values in the interdocument zone of the imaging surface, and responding to the sensing of the test pattern and the reference tone reproduction curve to adjust the machine operation for print quality correction.

13. In a printing machine having a moving imaging surface, a projecting system for modulating a beam and projecting an image onto the imaging surface, a developer for application of toner to the image projected onto the imaging surface for transfer of the image to a medium, a method of development control comprising the steps of;

storing a reference tone reproduction curve, providing a single test pattern on the imaging surface, the test pattern including a scale of pixel values, sensing the test pattern along the scale of pixel values on the imaging surface, and responding to the sensing of the test pattern and the reference tone reproduction curve to adjust the machine operation for print quality correction.

14. The method of claim 13 wherein the test pattern is provided in the interdocument zone of the imaging surface.

* * * * *